UNITED STATES PATENT OFFICE.

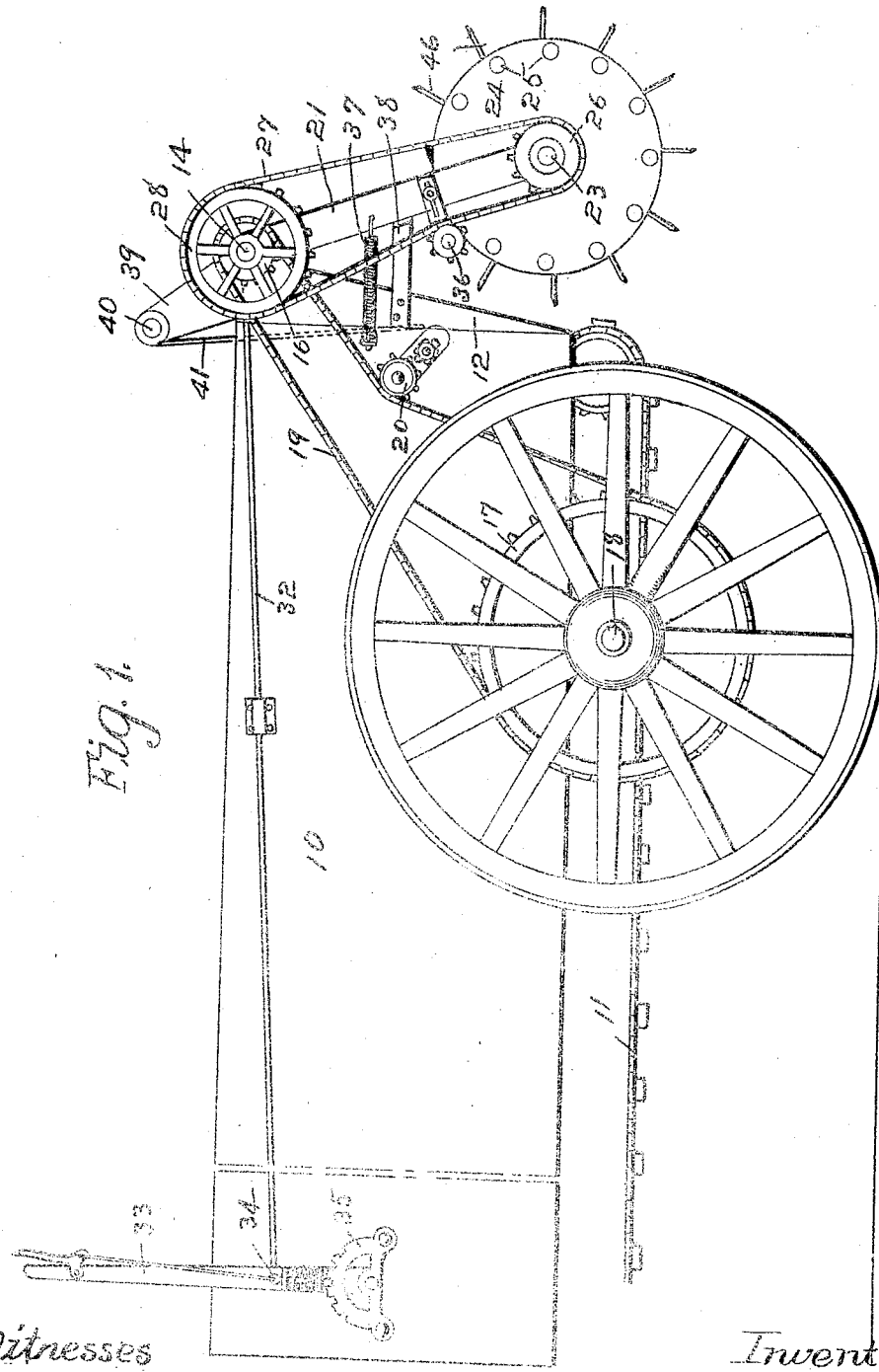

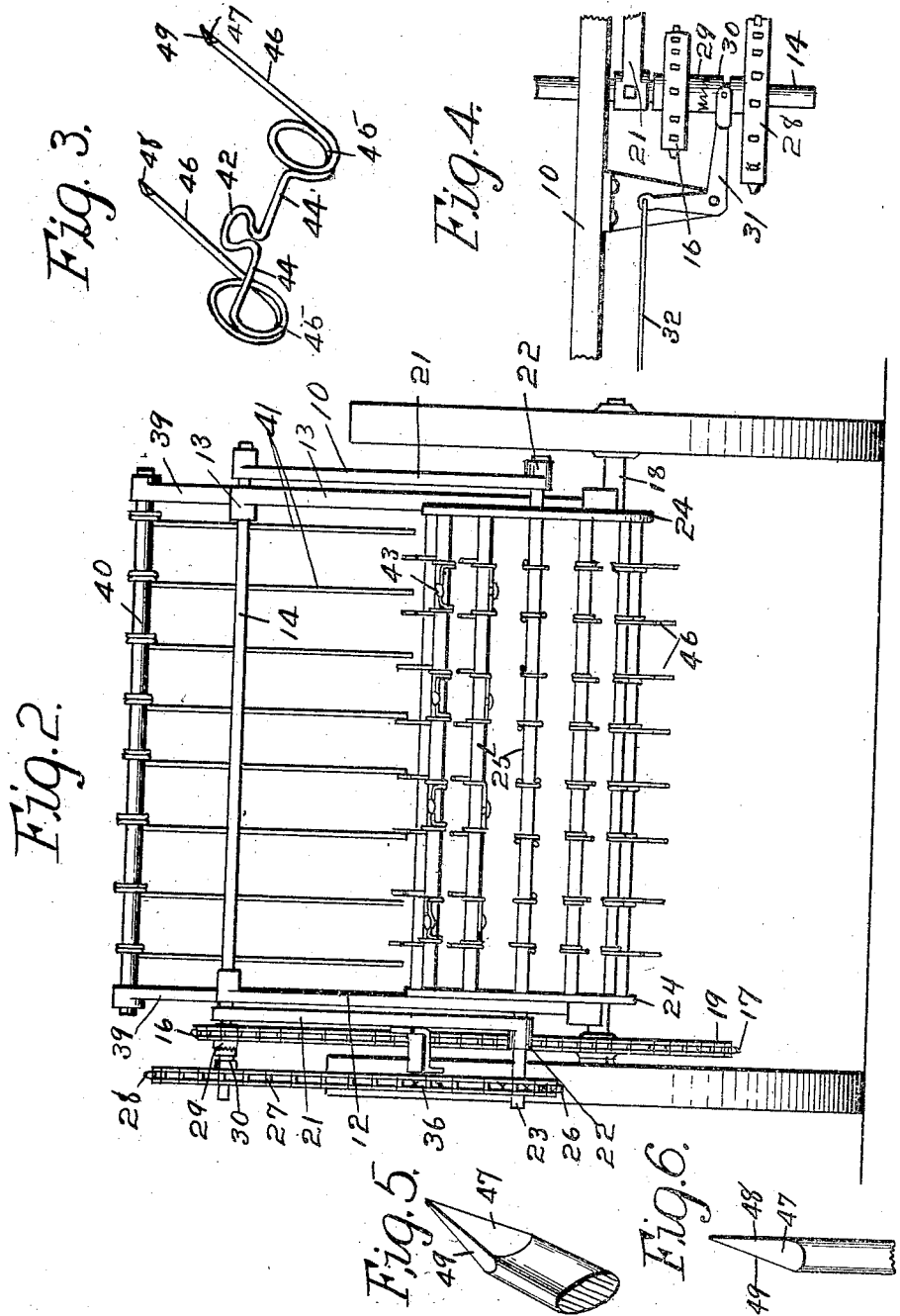

CHARLES L. DYK, OF ORANGE CITY, IOWA.

MANURE-SPREADER.

No. 894,261.     Specification of Letters Patent.     Patented July 28, 1908.

Application filed February 13, 1907. Serial No. 357,129.

*To all whom it may concern:*

Be it known that I, CHARLES L. DYK, a citizen of the United States, residing at Orange City, in the county of Sioux and State of Iowa, have invented a certain new and useful Manure-Spreader, of which the following is a specification.

The object of my invention is to provide a manure spreader of simple, durable and inexpensive construction in which the spreading cylinder is supported on hangers extended downwardly and rearwardly from the rear of the wagon body and yieldingly held toward the wagon body by springs so that in the event that a large object should be moved toward the rear of the wagon body, the cylinder will swing rearwardly and permit it to pass without danger of breaking the cylinder or the cylinder teeth.

A further object is to provide improved means for driving the cylinder at any position of its adjustment relative to the wagon body.

A further object is to provide an improved tooth for spreading cylinders of this class.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a side elevation of a manure spreader body having my improvements applied thereto. Fig. 2 shows a rear elevation of same. Fig. 3 shows a detail, perspective view of a pair cylinder teeth embodying my invention. Fig. 4 shows a detail, plan view of the clutch device for throwing the driving chain in and out of gear. Fig. 5 shows a detail, perspective view of the point of one of the cylinder teeth, and Fig. 6 shows an edge view of same.

Referring to the accompanying drawings, I have used the reference numeral 10 to indicate the body of the manure spreader. 11 indicates an apron of the ordinary kind designed to convey material within the body to the rear end thereof. The particular construction of the apron forms no part of my present invention and is, therefore, not illustrated or described in detail.

Mounted upon the rear of the wagon box are two brackets 12 tapered toward the bottom of the wagon box and having at their upper ends bearings 13 to support the stationary shaft 14, which shaft is provided with a sprocket wheel 16 rotatable thereon.

A sprocket wheel 17 is fixed to one of the supporting axles 18 of the wagon and a chain 19 connects said sprocket wheels. A chain tightener 20 of the ordinary type is provided for said chain and attached to the wagon box.

Mounted upon the shaft 14 are two hangers 21 extended downwardly and rearwardly and provided with bearings 22 at their lower ends in which a rotatable shaft 23 is mounted. Fixed to this shaft is a spreading cylinder, comprising two disks 24 and longitudinal bars 25 provided with teeth, hereinafter more fully described. Fixed to one end of the shaft 23 is a sprocket wheel 26 for driving the cylinder. It is connected by a sprocket chain 27 with a sprocket wheel 28 loosely mounted on the shaft 14.

I have provided for throwing the sprocket wheel 28 in and out of gear, as follows: On the hub of the sprocket wheel 16 is a clutch member 29 and on the hub of the sprocket wheel 28 is a clutch member 30. A bell crank lever 31 is connected to the clutch member 30 by which it may be moved into or out of engagement with the clutch member 29. The bell crank lever 31 is controlled by means of a rod 32 connected with the lever 33 provided with a spring actuated pawl 34 to engage a sector 35. A chain tightener 36 of ordinary construction is provided for the chain 27 and is adjustably connected with the adjacent hanger 21.

I have provided for yieldingly holding the cylinder toward the rear end of the wagon body by means of coil springs 37 connected to said hangers and to the adjacent sides of the adjacent body. The movement of the hangers toward the adjacent body is limited by the stops 38 fixed to the brackets 12 and arranged to engage the hangers.

By the arrangement of the driving devices for the cylinder, it is obvious that the forward portion of the cylinder will move downwardly. It is, therefore, desirable that means be provided for preventing material from the wagon body passing on top of the cylinder. I have, therefore, provided two brackets 39 fixed on top of the brackets 12 and supporting a transverse bar 40. On this bar is a number of spring rods 41 extended downwardly within the wagon body to a point adjacent to the top of the cylinder to prevent the contents of the wagon body from dropping on top of the cylinder.

I have provided improved spring teeth for the spreading cylinder as follows: The teeth are formed in pairs, each pair being formed of a single piece of spring metal rod. The central portion of each piece is formed into a loop 42 designed to receive a bolt 43 and attaching the pair of teeth to the bars 25. Beyond the loop 42, the rod extends outwardly in opposite directions at 44. At the ends of the parts 44 are the coils 45 to encircle the bars 25 and at the ends of the coils are the teeth proper 46, each tooth has its end pointed, as shown in Figs. 5 and 6, the point being oval in cross section with its edges 47 tapered toward a point and one side being in line with the tooth while the opposite side 49 is beveled. This straight side 48 is arranged at the front of the tooth in respect to its line of advance around the cylinder, as clearly shown in Fig. 1.

In practical use and assuming that the spreader is being advanced over a field, the material within the wagon body is carried by the apron to the rear end thereof and discharged toward the spreading cylinder. This cylinder is being rotated in a direction causing the teeth adjacent to the wagon body to move downwardly, thus tearing loose the particles of the material and discharging them upon the ground. In the event that the apron should feed the material very rapidly, the springs 37 will yield and permit the cylinder to swing rearwardly far enough to permit the excessive quantity of material to pass through without danger of injuring the spreading cylinder or in the event that a hard or solid object should be contained within the wagon body, it will when striking the cylinder cause the cylinder to swing rearwardly and permit the object to drop without danger of breaking the cylinder or the teeth thereof. Normally the teeth on the cylinder are so close to the rear end of the wagon that no appreciable quantity of the material may pass from the wagon without being engaged by the teeth and torn into small particles. By the arrangement of sprocket gear, it is obvious that the cylinder will be operated equally well when at any position of its limit of movement relative to the wagon body.

Having thus described my invention, what I claim and desire to secure by Letters Patent of the United States, therefor is—

1. In a manure spreader, the combination of a wagon body, hangers pivotally connected with the wagon body and extended downwardly at the rear thereof, a spreading cylinder supported by the said hangers, a shaft mounted at the pivotal point of the hangers, and a gearing device mounted on the shaft and connected with the cylinder for driving the latter.

2. In a manure spreader, the combination of a wagon body, hangers pivotally connected with the wagon body and extended downwardly at the rear thereof, a spreading cylinder supported by the said hangers, a shaft mounted at the pivotal point of the hangers, a gearing device mounted on the shaft and connected with the cylinder for driving the latter and a clutch for throwing the cylinder in and out of gear.

3. In a manure spreader, the combination of a wagon body, hangers pivotally connected with the wagon body and extended downwardly at the rear thereof, a spreading cylinder supported by the said hangers, a shaft mounted at the pivotal point of the hangers, and a gearing device mounted on the shaft and connected with the cylinder for driving the latter, and a spring for yieldingly holding the cylinder toward the wagon body.

4. In a manure spreader, the combination of a wagon body, hangers pivotally connected with the wagon body and extended downwardly at the rear thereof, a spreading cylinder supported by the said hangers, a shaft mounted at the pivotal point of the hangers, a gearing device mounted on the shaft and connected with the cylinder for driving the latter, the spring for yieldingly holding the cylinder toward the wagon body and a stop for limiting the movement of the cylinder toward the wagon body.

5. In a manure spreader, the combination with a wagon body, of brackets secured to the rear thereof, a shaft supported in said brackets, a pair of hangers mounted on the shaft and extended downwardly at the rear of the wagon body, a spreading cylinder supported by said hangers, a sprocket gearing operatively mounted on the said shaft and connected with the said spreading cylinder, a manually controlled clutch device for throwing the cylinder in or out of gear, a bar supported above the rear of the wagon body, a number of spring rods fixed thereto and extended downwardly in advance of the cylinder, a spring for yieldingly holding the cylinder toward the wagon body and a stop for limiting the movement of the cylinder toward the wagon body.

6. In a device of the class described, a cylinder tooth having its outer end oval in cross section with its edges tapered toward a point and with one side straight and the other beveled toward the point.

7. In a manure spreader, the combination of a wagon body, hangers at the rear of the wagon body capable of movement toward and from the wagon body, a spreading cylinder rotatably mounted in said hangers, and a spring for yieldingly holding the hangers toward the wagon body.

8. In a manure spreader, the combination of a wagon body, hangers at the rear of the wagon body capable of movement toward and from the wagon body, a spreading cylinder rotatably mounted in said hangers, a spring for yieldingly holding the hangers toward the wagon body, a stop for limiting the movement of the hangers toward the wagon body, and means for rotating the cylinder when in various positions of its adjustment.

Des Moines, Iowa, January 28, 1907.

CHARLES L. DYK.

Witnesses:
P. D. VAN OOSTERHOUT,
JNO. BROLSMA.